(No Model.)  3 Sheets—Sheet 1.
S. C. MENDENHALL.
GLASS ROLLER FOR SKATES, CASTERS, AND OTHER ARTICLES, AND THE PROCESS OF PRODUCING THE SAME.
No. 314,969.  Patented Mar. 31, 1885.
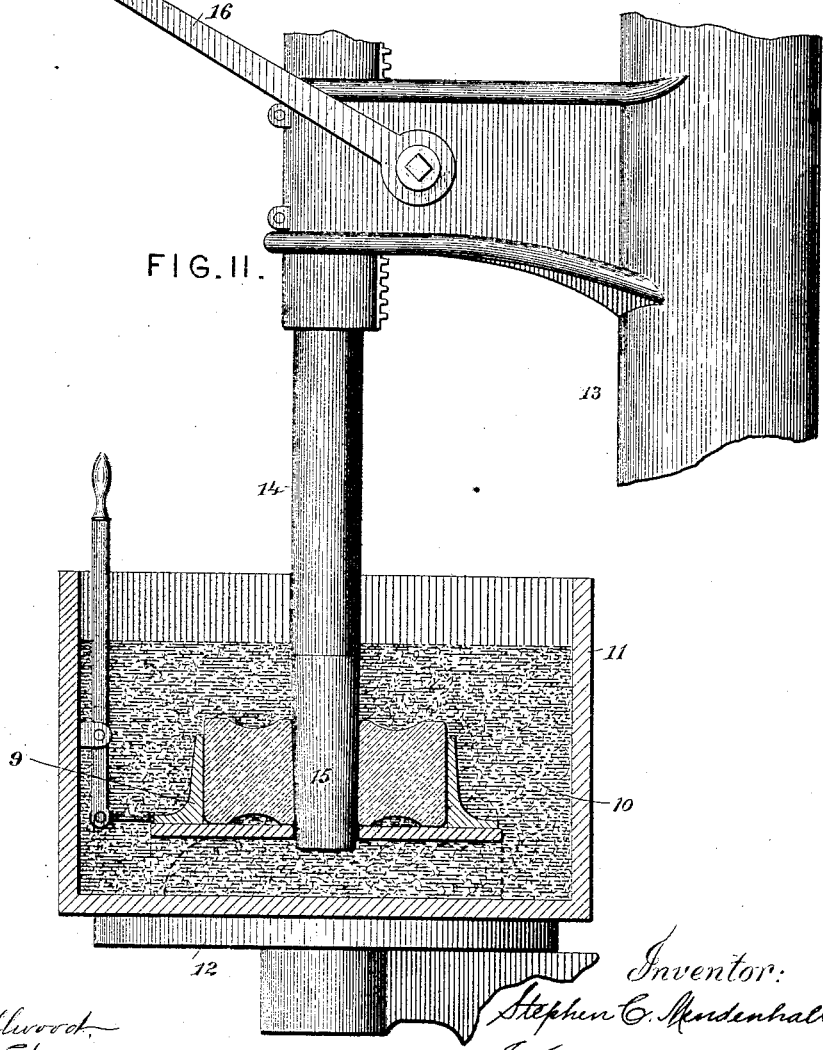

(No Model.)　　　　　　　　　　　　　　　　　　3 Sheets—Sheet 2.
S. C. MENDENHALL.
GLASS ROLLER FOR SKATES, CASTERS, AND OTHER ARTICLES, AND THE PROCESS OF PRODUCING THE SAME.
No. 314,969.　　　　　　　　　　　Patented Mar. 31, 1885.
FIG. III.
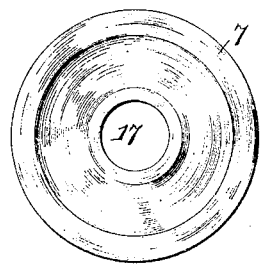
FIG. IV.
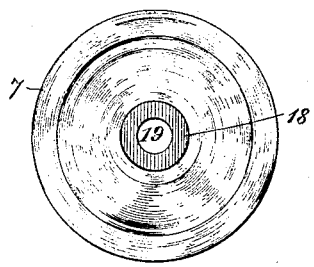
FIG. VII.
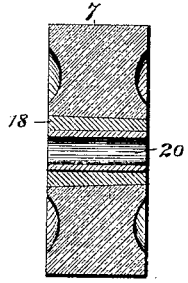
FIG. V.
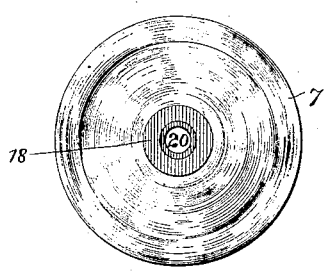
FIG. VI.
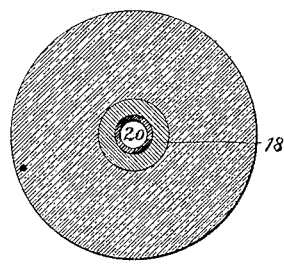
FIG. VIII.
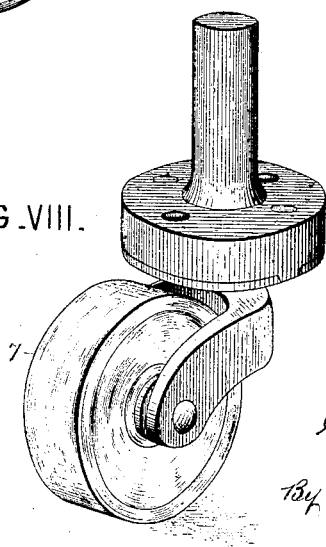

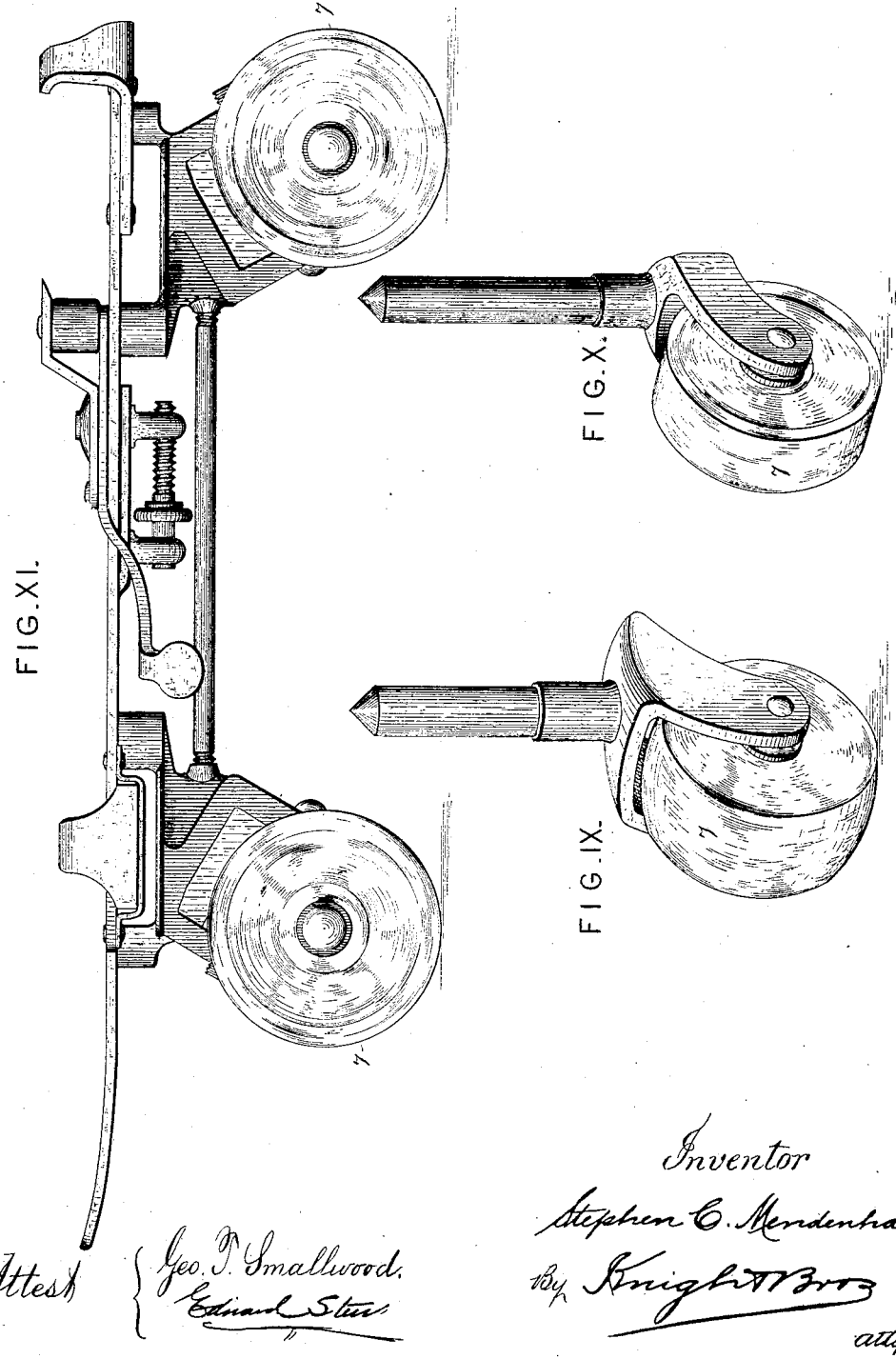

UNITED STATES PATENT OFFICE.

STEPHEN C. MENDENHALL, OF RICHMOND, INDIANA.

GLASS ROLLER FOR SKATES, CASTERS, AND OTHER ARTICLES, AND THE PROCESS OF PRODUCING THE SAME.

SPECIFICATION forming part of Letters Patent No. 314,969, dated March 31, 1885.

Application filed August 30, 1884. (No model.)

*To all whom it may concern:*

Be it known that I, STEPHEN C. MENDENHALL, a citizen of the United States, residing at Richmond, in the county of Wayne and State of Indiana, (present business address Cincinnati, Ohio,) have invented certain new and useful Improvements in Glass Rollers for Skates, Casters, and other Articles, and in the Process of Producing the Same, of which the following is a specification.

Rollers for skates, casters, and like articles have been usually made of metal or wood. Glass, however, has many advantages which make it desirable for this purpose. Among the principal may be mentioned its insulating properties, (especially valuable when applied to a bed or musical instrument,) its lack of friction, and its beauty. A heretofore insuperable difficulty to the general introduction of glass rollers, however, has been the impossibility of manufacturing a roller which should be at the same time practical in operation, cheap, and durable. The trouble lies in the difficulty with which glass rollers are provided with strong, durable, and frictionless bearings. Various plans suggest themselves for accomplishing this purpose in a more or less incomplete way. For example:

First. The roller may be provided with a drilled axial opening, through which the axle is loosely passed. The trouble here, however, is the lack of durability and strength and the cost. The axle having with certainty an uneven bearing would constantly chip off pieces of the glass until the bearing became loose and unsteady, resulting in much friction and a short life for the caster. The drilling of the bearing with a diamond drill is also a tedious and expensive operation.

Second. The roller may be provided with a brass or Babbitt-metal bushing having either a smooth or a roughened exterior, upon and around which the glass may be molded. The difficulty here lies in the feebleness of the article produced. The shrinkage of the glass onto its bushing while cooling places it under an initial strain which renders the roller apt to fly to pieces at the slightest shock.

Third. Glass trunnions may be constructed on the roller itself and arranged to occupy slotted bearings in the yoke-arms; but it is well known that a small quickly-cooled projection on a larger body of glass is exceedingly brittle. It results that the trunnions on casters of this sort would break off very easily, unfitting the caster for sustaining heavy weights or sudden shocks. Or Fourth. The reverse of this method might be employed, and trunnions on the yoke-arms be made to occupy axial sockets or bearings in the sides of the roller. Here, however, the glass bearings would gradually be chipped off and become rough and loose; the arms, besides, would be liable to be sprung out by the same amount of strain applied as sufficient to spring them in, so that such a caster would be entirely unsuited for heavy use. I have found, however, that by improving the molding and finishing apparatus a glass roller may be made which possesses all the valuable properties while avoiding all the evils of those casters above described. To this end I employ a two-part mold with a plunger arranged to penetrate the molten glass axially in such a manner as to crowd it into all the recesses of the mold, making the roller perfect in form, compressing the glass, and forming an opening for the bushing at the same operation. The projecting fin of glass is then removed, and the roller, after annealing, is placed in a tub of emery (or sand) and water in which a slightly-conical drill of chilled steel is made to rotate. The roller being clamped in the path of said drill, the axial hole is bored out perfectly true, slightly conical, and with slightly-roughened sides. Into the roller thus formed I insert a bushing of wood, rubber, or metal, or a combination of two of these materials, which bushing is driven tightly to place and retained fixedly in the roller by cement and by the roughened surface within the roller. A roller thus made has been submitted by me to the severest tests without either breaking the glass or removing or loosening the bushing, a perfectly even bearing all around the bushing being obtained, and this without placing the glass under any initial strain.

In order that my invention may be more fully understood, I will proceed to describe it with reference to the accompanying drawings, in which—

Figure I is a sectional view representing as simply as possible the form of mold employed by me. Fig. II is a similar view of the finishing drilling apparatus. Fig. III is a faced view of the improved roller as it comes from the finishing-machine. Fig. IV is a similar view of the same with a wooden bushing in place. Fig. V is a similar view showing a brass tubular bushing inserted within the wooden bushing. Fig. VI is a vertical section of the roller shown in Fig. VIII, transverse to the axis thereof. Fig. VII is a sectional view taken longitudinally of the axis. Fig. VIII is a perspective view of a complete caster having one of my glass rollers. Fig. IX is a perspective view of a caster spindle and frame having a thick glass roller of the preferred form for heavy articles—such as beds or pianos. Fig. X is a similar view showing the roller of slightly-different form, used for lighter furniture. Fig. XI represents in side elevation a skate with my improved rollers applied.

The mold and finishing apparatus here shown are merely intended to represent in outline apparatus designed to carry out the process. These devices are not claimed herein, being reserved for claim in subsequent applications. As here shown, the mold consists of two parts, 1 2, the former hinged to the latter and the latter fixed to the bed-plate 3. The surface of this bed-plate inclosed by the jaws 1 2 is curved in the form to be given the sides of the roller. A similarly-curved cap-plate, 4, is hinged so as to be operated by a lever to bring it over the molten mass of glass when it is sheared off and allowed to drop into the mold. The mold is here shown after the operation with the jaw 1 thrown back. When the jaws are closed and the molten glass of a little more than the quantity sufficient to form the roller dropped in, the cap 4 is brought over it and a plunger, 5, forced down by any suitable lever mechanism. The plunger 5 is preferably slightly tapering, as shown, and holes of proper dimensions are allowed for its passage in both cap and base-plate. The passage of the plunger 5 through the glass forces the glass into the form of the mold, compresses it slightly, makes a slightly-tapering axial hole, and expels the surplus glass through the aperture in the base-plate, (see Fig. I,) where the surplus glass 6 is shown projecting in the form of a fin, and united to the roller 7 by a thin film of glass, 8. The plunger and cap are now withdrawn, the mold opened, and the fin 6 8 removed by a slight blow. The roller thus formed, and after being carefully annealed, is fixed by clamp 9 beneath the surface of a semi-liquid mixture, 10, of emery, (or sand or its equivalent,) and water contained in a tub, 11, which is placed on the table 12 of a suitable drill-press, the standard of which is shown at 13. The drill 14, which is preferably employed, and which is fixed in ordinary way in the chuck of the drill, is made of chilled steel, and has slightly-tapering lower end, 15, of a size corresponding to the desired size of the hole in the roller. The drill, being put in rapid rotation in ordinary manner, is forced down by lever 16 into the axial hole in the roller, carrying with it the emery or sand "mush," and thus quickly removing all inequalities of surface and producing a central aperture, on which a bushing will have perfectly even bearing all around. The ground surface thus left on the glass also aids materially in retaining the bushing in place. The roller is now in the condition shown in Fig. III. The pin 18, which is to occupy the hole 17 and serve as a bushing, is prepared of slightly-tapering form, corresponding to that of the hole 17, and is made, preferably, of hard wood, hard rubber, or other material, preferably slightly elastic. The pin is first covered with cement, and then driven firmly into place in the roller, where it is so firmly held by the cement and the roughened surface of the glass that I have found by actual experiment that it is impossible to remove it without breaking the roller. The pin is not driven in with force enough to put the glass under any initial strain; indeed, but a slight blow is all-sufficient to render the parts inseparable. In this employment of a bushing which is driven to place and cemented while both glass and bushing are in a cold state consists the principal novel feature of my invention. The resultant advantage is, that neither glass nor bushing is under any initial strain, and yet they are by my process closely and inseparably united. It is obvious that it is immaterial, so far as this part of the invention is concerned, whether the bushing be of wood or metal; both or either may be used. The pin being in place, its ends are cut off slightly beyond the surface of the glass. The roller is then chucked in a lathe, and the axial hole 19, Fig. IV, bored therein. By thus boring the hole 19 after these parts are put together I am enabled to secure it in perfectly axial position notwithstanding any imperfections in the making of the glass roller. Should very hard wood be used for the bushing 18, the roller in the form shown in Fig. IV would now be complete. Ordinarily, however, it is found advisable to protect the bushing, if of wood or rubber, by a sleeve, 20, of brass, Babbitt or other anti-friction metal, the end of a long metallic tube being driven firmly into the roller, and being then sawed off close to the end of the wooden bushing. Several views of the roller in this completed form are shown in Figs. V, VI, and VII, while Figs. VIII to XI represent two different forms of the glass roller applied to casters and skates.

In Fig. VIII the complete caster is shown provided with the anti-friction top, which I have made the subject of other applications for Letters Patent.

In Fig. IX is shown the caster which is used for heavy furniture, having broad curved tread. Fig. X shows a lighter caster for lounges, &c., having a narrow level tread. The advantages of a glass roller for these purposes I have before stated.

Additional advantages for skates are its noiselessness, its strength, and its smoothness.

In Fig. XI a skate having such rollers is shown. The rollers employed for this purpose may either be slightly roughened or they may be finished smooth, friction on the floor being best to give the roughened surface desirable.

By the use of hard rubber or wood as a bushing an additional insulating material to that of the glass roller is provided. The roller is consequently as perfect an insulator as could be desired for beds, pianos, &c. Wood or hard rubber or the like is also valuable for this purpose, because by its elasticity it takes into the asperities of the ground-glass opening, and so makes the bearing perfectly rigid.

Having thus described my invention, what I claim as new therein, and desire to secure by Letters Patent, is—

1. The process of making glass rollers which consists in molding the roller with an axial opening and then driving a bushing pin or sleeve therein, substantially as set forth.

2. The process of making glass rollers which consists in molding the roller with an axial opening, drilling said opening with emery or sand, and then driving in a suitable bushing, substantially as set forth.

3. The process of making glass rollers which consists in forming the roller with an axial tapering opening, driving the bushing-pin into said opening, and subsequently boring said bushing, substantially as set forth.

4. A roller for casters, skates, and similar articles, made of glass, and having a bushing of wood, rubber, or equivalent material, substantially as set forth.

5. A roller for casters, skates, and similar articles, made of glass, and having a bushing cemented in said rollers, substantially as set forth.

6. A roller for casters, skates, and similar articles, made of glass, having a tapering axial opening and a tapering wooden or equivalent bushing driven therein, substantially as set forth.

7. A roller for casters, skates, and similar articles, made of glass, having an axial opening, a wooden or equivalent bushing therein, and a brass or other hard bushing within said wooden bushing, substantially as set forth.

STEPHEN C. MENDENHALL.

Witnesses:
HARRY E. KNIGHT,
H. S. KNIGHT.